Aug. 4, 1925.

H. TAVERNIER

WINDSHIELD CURTAIN

Filed April 2 1924

Inventor
H. Tavernier
By
Lacy & Lacy, Attorneys

Patented Aug. 4, 1925.

1,548,396

UNITED STATES PATENT OFFICE.

HORMIDAS TAVERNIER, OF BALTIC, CONNECTICUT.

WINDSHIELD CURTAIN.

Application filed April 2, 1924. Serial No. 703,748.

*To all whom it may concern:*

Be it known that I, HORMIDAS TAVERNIER, a citizen of the United States, residing at Baltic, in the county of New London and State of Connecticut, have invented certain new and useful Improvements in Windshield Curtains, of which the following is a specification.

This invention relates to a protective curtain for automobile windshields and has as its general object to provide a curtain which, when properly adjusted, will serve to prevent fragments of the windshield panes reaching the occupants of the vehicle, in event of accidents, and which will likewise be useable as a means for protecting the driver from the glare of an oncoming machine, when driving at night, or protect him from the rays of the sun, during the daylight hours.

Another object of the invention is to provide a curtain for the purpose stated above which may be readily mounted upon any ordinary automobile and which, while not in use, may be stored away in the upper portion of the front of the top of the automobile where it will be practically concealed from view, the invention contemplating the provision of means whereby the curtain may be instantly lowered without the necessity of directly manually lowering the same.

Figure 1:
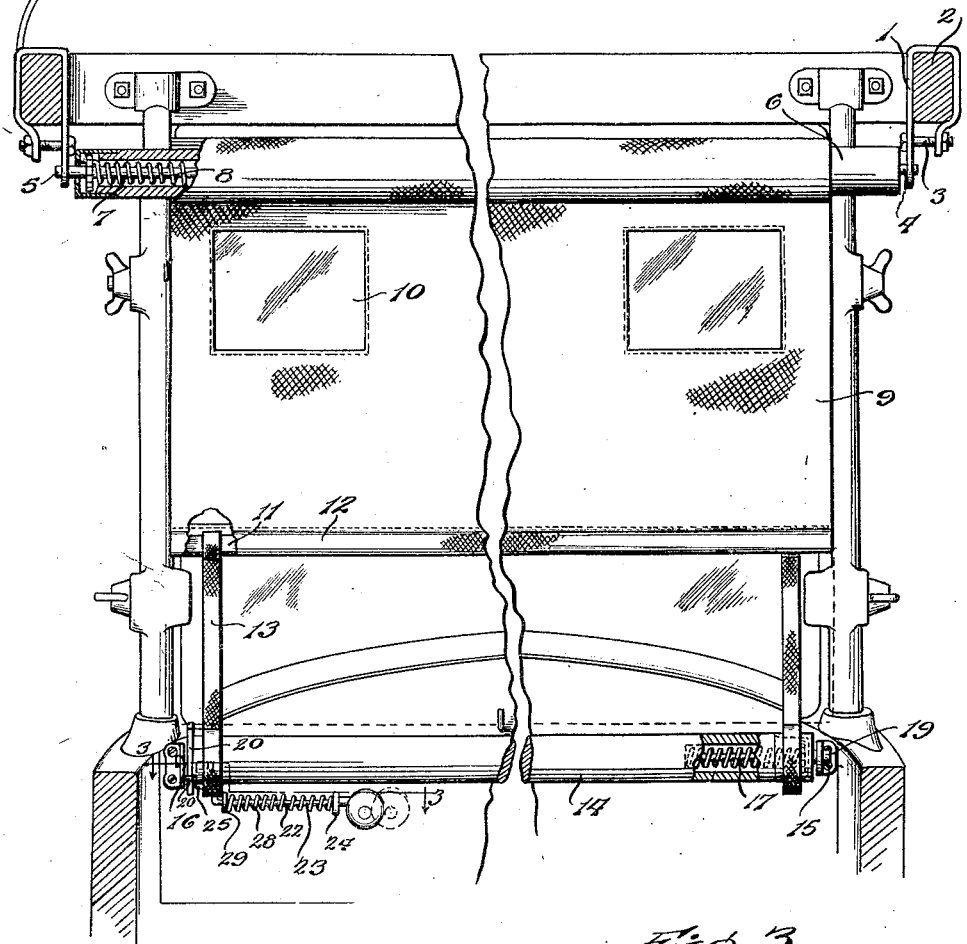
Figure 1 is a view in rear elevation of the device embodying the invention installed upon an automobile.
Figure 2:
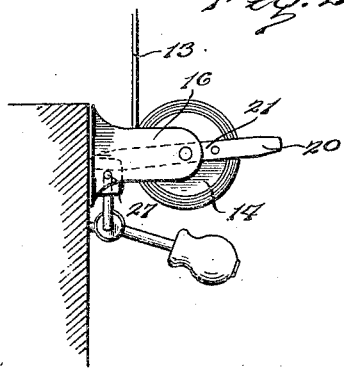
Figure 2 is a view in end elevation of one lower corner of the device.
Figure 3:
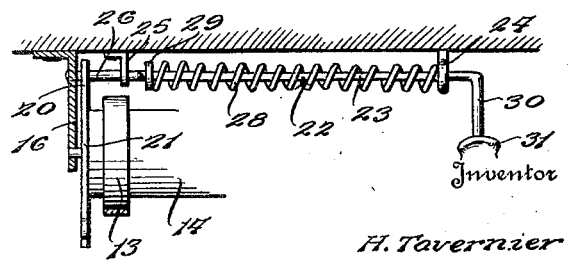
Figure 3 is a detail horizontal sectional view taken substantially on the line 3—3 of Figure 1 looking in the direction indicated by the arrows.

In the drawing, the numeral 1 indicates a pair of brackets which are of a form adapting them to be fitted over the stays for the top of the automobile, which stays are indicated by the numeral 2, the brackets being clamped in place by means of bolts 3. The brackets are provided one with a circular opening and the other with an oblong opening (not shown) corresponding to the similar openings in a pair of window curtain brackets and adapted to receive respectively the round stud 4 and the square stud 5 at the opposite ends of a curtain roller 6 which is substantially the same as an ordinary shade roller in windows. The square stud 5 is carried at the outer ends of a spindle 7, and the usual coil spring 8 is associated with this spindle and is adapted to be tensioned when the roller 6 is rotated in one direction.

The curtain is indicated by the numeral 9, and may be of any material such, for example, as cloth, canvas, rubberized cloth, or any thin and flexible opaque material suitable for the purpose. The curtain along its upper margin is secured to the roller 6 in the usual manner and the curtain is normally stored upon this roller, being more or less tightly wound therearound. For a purpose to be presently explained, panes 10 of thin celluloid or the like, of a transparent character, are set into the curtain at a suitable elevation, as clearly shown in Figure 1.

The lower margin of the curtain 9 is preferably held straight by a rod 11 arranged within a hem 12 formed at the said margin of the curtain, and permanently connected to this rod are the upper ends of tapes or other flexible connections indicated by the numeral 13. The other or lower ends of the tapes are secured to a roller 14, near the ends thereof, which roller is similar to the roller 6 and is mounted in suitable brackets 15 and 16 secured or mounted upon any suitably located fixed part of the body of the automobile. A spring 17 is arranged within the roller 14 and is connected to the said roller and to a rod 18 corresponding to the rod 7 of the roller 6, this rod terminating in a squared stud 19 mounted in the bracket 15. The rollers 6 and 14 are reversely arranged, or, in other words, they are so arranged that the tendency of the spring 17 is to rotate the roller 14 in a direction to wind up the tapes 13 and unwind the curtain 9 from the roller 6, the tendency of the spring 18 is to wind the said curtain onto the said roller 6. However, for purposes which will hereinafter be made apparent, the spring 17 is of greater strength than the spring 8. It will be evident at this point that when the rollers are unrestrained, the roller 14, through the medium of the spring 17, will be rotated to wind up the tapes 13 and therefore lower the curtain 9 against the tension of the spring 8 of the roller 6. However, the present invention contemplates the provision of means for restraining the roller 14 against rotation so that when the curtain 9 is wound upon the roller 6 and is not in actual use, the curtain will be entirely clear of the windshield and substantially concealed from view.

The means referred to above comprises one or more fingers 20 which may constitute the projecting ends of a bar 21 secured in any suitable manner to that end of the roller 14 which is located next adjacent the bracket 16. The numeral 22 indicates in general a detent comprising a rod 23 slidably mounted in brackets 24 and 25 which are in turn mounted upon some convenient fixed part of the body of the automobile, the rod at one end being extended beyond the bracket 25 to provide a detent finger 26, the free end of which fits slidably in an opening 27 formed in the bracket 16. A spring 28 is fitted onto the rod 23 and bears at one end against the bracket 24 and at its other end against a collar or shoulder 29 formed or provided upon the said rod. The other end of the rod 23 is turned preferably at right angles as indicated by the numeral 30 and carries a handle 31 which may be grasped for the purpose of shifting the rod in the brackets 24 and 25 against the tension of the said spring 28, it being understood that the spring normally holds the rod so shifted as to project the detent finger 26 in the path of the fingers 20 in the rotative movement of the roller 14.

In practice the curtain will normally be rolled up upon the roller 6. In the event the driver of an automobile equipped with the invention sees the inevitability of a collision either with another machine or with some object, he may protect himself and the other occupants of the automobile from injury through flying glass in the event of shattering of the windshield, by pulling laterally upon the knob 31 as illustrated in dotted lines in Figure 1 of the drawings. By thus manipulating the handle 31 and shifting the rod 23, the detent finger 26 will be shifted out of the path of the fingers 20 upon the roller 14. The roller 14 will then be immediately released and the spring 17 will immediately rotate the said roller so as to wind up the tapes 13 and quickly draw down the curtain 9 so that it will extend over the entire windshield. When the curtain is fully lowered, the operator's view is not obstructed inasmuch as at least one of the windows 10 will at such times be directly in front of his eyes. The operator is therefore enabled to control his automobile and make such attempt as possible to avoid the collision although if the collision cannot be avoided and the windshield is shattered, the pieces thereof will fly against the curtain and thus be prevented from striking and injuring the occupants of the machine. It will also be evident that the curtain may be employed while driving at night, in its full lowered position, so that the blinding effect of the headlights of oncoming machines will be somewhat minimized. Likewise it will be evident that the curtain, either fully lowered or part way lowered, may be made use of in daylight hours to protect the driver and anyone who may be seated with him from the rays of the sun. The curtain can, of course, be maintained at any desired adjustment by either arresting its downward movement through a return shifting movement or release of the rod 23 after it has been retracted, and at the proper period in the descent of the curtain, or, after the curtain has been completely lowered, it may be completely elevated, or elevated to any desired height, by retracting the rod 23 with one hand upon the knob 31, and then lifting upwardly upon the lower margin of the curtain, the slack in the curtain being automatically taken up by the roller 6, the spring 8 being sufficiently strong to rotate the roller 6 to wind the curtain thereon and take up slack in the tapes 13.

Having thus described the invention, what is claimed as new is:

1. A device of the class described comprising companion spring tensioned rollers, a curtain connected to and wound upon one of the rollers, a flexible element connected to the curtain and to the other roller and wound upon the last mentioned roller, the spring of the last mentioned roller being stronger than the spring of the other roller, and means normally holding one of the last mentioned rollers against rotation and operable to release the said roller for rotation.

2. In a device of the class described, companion rollers, springs tensioning the rollers and constituting means for rotating the individual rollers, the spring of one roller being of greater strength than the spring of the other roller and the springs being arranged to rotate the rollers in opposite directions, a curtain connected to and wound upon one of the rollers provided with the weaker spring, a flexible connection connected to the curtain and also connected to and wound upon the roller having the stronger spring, and means normally restraining the roller having the stronger spring against rotation and operable to release the roller for rotation.

3. A device of the class described comprising companion rollers, springs associated with the rollers and constituting means, when tensioned, to rotate the respective roller, a curtain connected to and wound upon one of the rollers, a flexible elemet connected to the curtain and wound upon the other roller, the spring of the last mentioned roller being of greater strength than the spring of the first mentioned roller, and means normally restraining the last mentioned roller from rotation and operable to release the same.

4. In a device of the class described, companion rollers, springs associated therewith and constituting means, when tensioned, to impart rotary motion to the respective roller, a curtain secured to and wound upon one of the rollers, a flexible element connected to the curtain and wound upon the other roller, the spring of the last mentioned roller being of greater strength than the spring of the first mentioned roller, an abutment element upon the last mentioned roller extending radially thereof and beyond the same, and a detent normally occupying a position in the path of movement of the said abutment element, the detent being adjustable to position out of said path whereby to release the second mentioned roller for rotation.

In testimony whereof I affix my signature.

HORMIDAS TAVERNIER. [L. S.]